United States Patent Office 3,353,635
Patented Nov. 21, 1967

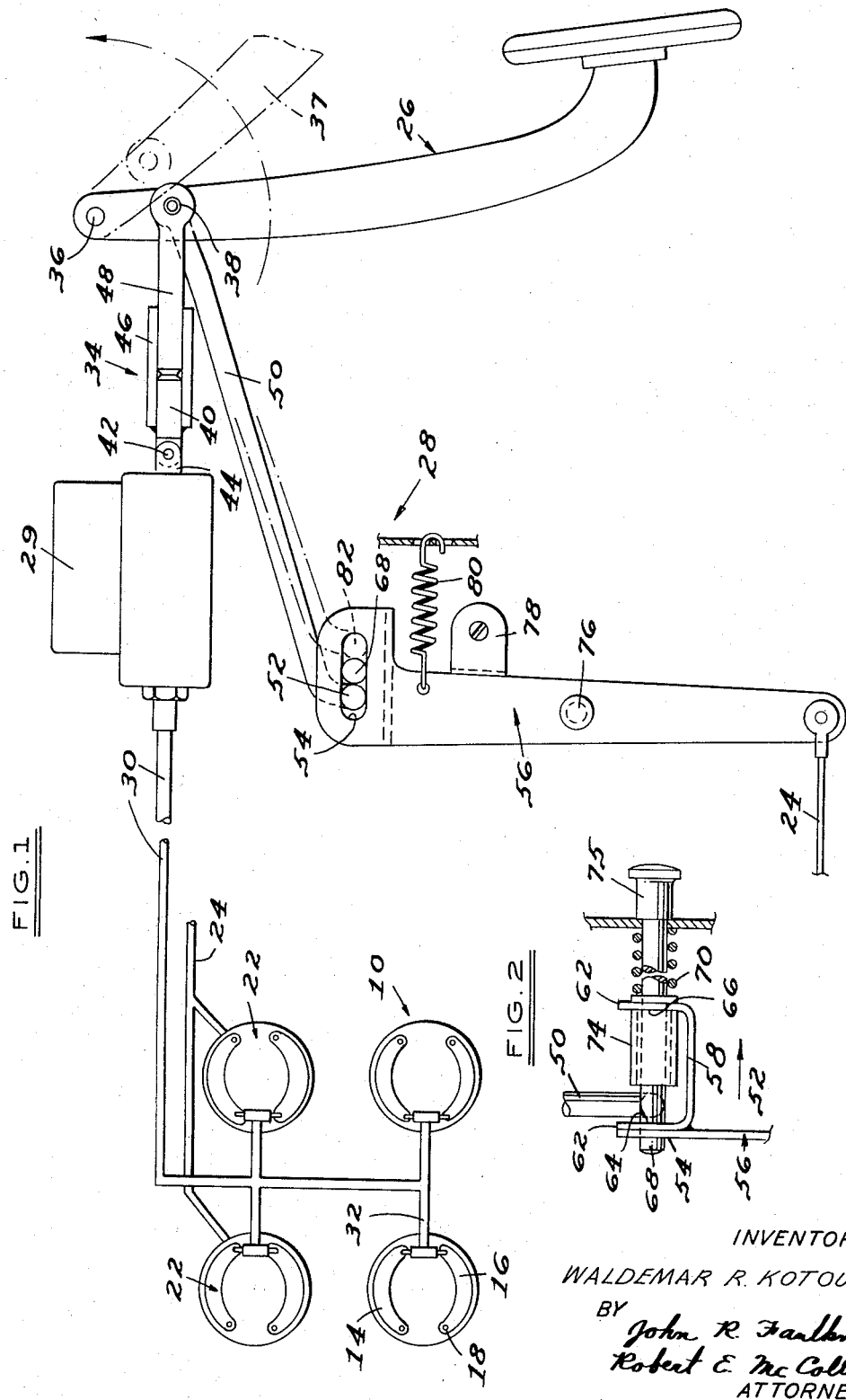

3,353,635
SINGLE PEDAL DUAL BRAKE SYSTEM
Waldemar R. Kotoucek, Detroit, Mich., assignor to Ford Motor Company, Dearborn, Mich., a corporation of Delaware
Filed Dec. 2, 1965, Ser. No. 511,104
16 Claims. (Cl. 188—106)

ABSTRACT OF THE DISCLOSURE

A braking system for a motor vehicle in which the conventional brake pedal actuates a fluid pressure operated service brake system and subsequently a mechanical brake system upon failure of the fluid pressure system; alternately, a stop pin, connected to a mechanical brake system lever, is moved to reposition the mechanical actuator link and also the fluid pressure system actuator link so that the sequence of operation is reversed, thereby effecting first an actuation of the mechanical system as a parking brake, or, upon a break in the cable of the latter, subsequently, the fluid pressure system.

---

This invention relates to an integrated parking and service brake system. More particularly, it relates to a motor vehicle brake system that provides hydraulic service braking and mechanical parking or emergency braking, all by operation of the same pedal.

In current motor vehicles, the driver operates the hydraulic service brake system by depressing the conventional brake panel. The mechanical brake system, for parking or emergency purposes, generally is actuated independently so that if the hydraulic system fails, the mechanical brake system can always be utilized by the driver to bring the vehicle to a stop. However, the time it takes for the driver to locate and actuate the mechanical brake system after a failure of the hydraulic system is detected is very critical if accidents are to be prevented. Therefore, a reduction in this time element is very desirable.

In recent years, split or tandem master brake cylinders have been installed in some vehicles to provide alternate sources of brake fluid in case one should not function. This additional protection, though, is ineffective if the hydraulic conduits or seals located beyond the hydraulic actuating system fail.

Attempts have been made in the past to design brake systems that utilize one pedal to actuate both the service and parking brakes. Such designs, however, have not provided a fail-safe system that permits an automatic transition to mechanical brakes upon failure of the hydraulic brake system. For this reason, none of these known brake systems has been adopted by the automative industry.

Accordingly, a principal object of this invention is to provide two parallel braking systems for motor vehicles that are actuated by a common pedal; a hydraulic system for service braking and a mechanical system for emergency braking and for parking. If a hydraulic failure should occur, the mechanical brake system will be actuated automatically and full driver control will be maintained. A small amount of lash is built into the mechanical system so that a slight pedal drop will be felt by the driver at the instant of hydraulic failure.

Another object of this invention, therefore, is to provide for the actuation of a mechanical brake system for emergency stopping by further depression of the conventional foot pedal after the hydraulic brake system has failed.

A further improvement is incorporated to permit the driver to select at will which system is to be used; either the hydraulic system for service braking, or the mechanical system for parking. To operate the parking brake, the driver pulls out a control knob, releases the brake pedal, pushes in the control knob, and again depresses the brake pedal. Actuation of the control knob repositions a pin in a lost motion type linkage to eliminate lost motion normally existing between the pedal and mechanical system, the release of the pedal introducing a lost motion between the pedal and the fluid or hydraulic system. The system normally operates to apply the brakes by the sequential operation of the fluid and mechanical systems in that order. Actuating the pedal and control knob in the manner described will reverse this sequence so that, essentially, only the mechanical system is used to apply the brakes.

A further object of this invention, therefore, is to provide a one-pedal integrated vehicle brake arrangement having a hydraulic service braking system and a mechanical braking system, with the latter being controlled for operation by the vehicle operator.

Other objects, features and advantages of the invention will become apparent upon reference to the succeeding, detailed description thereof, and to the drawings illustrating the preferred embodiment thereof; wherein, FIGURE 1 is a schematic side-elevational view of a mechanism embodying the invention for actuating the hydraulic and mechanical brake systems of a motor vehicle; and, FIGURE 2 is a cross-sectional view taken on a plane indicated by and viewed in the direction of the arrows 2—2 of FIGURE 1.

FIGURE 1 schematically illustrates a braking system constructed according to the invention. It includes a fluid pressure actuated mechanical friction brake 10 for each wheel, which in this case is four. Each brake per se is of a known construction, and includes a drum 12 secured to the wheel and cooperating with a pair of arcuately movable primary and secondary brake shoes 14 and 16. The shoes are pivotally mounted at one end 18 against stationary anchor pins, and are biased inwardly at their opposite ends against the ends of the plungers of a wheel cylinder 20.

The invention provides a mechanical system for applying the two rear brakes 22, and a fluid pressure system for applying all four brakes. The mechanical system, in general, includes a Bowden wire type mechanism 24 that is operatively connected in a known manner to brake shoes 14 and 16 of rear units 22 so that a pull on the Bowden wire will engage the brakes. The Bowden wire in turn is connected to a conventional brake pedal 26 by suitable linkage 28 to be described.

The fluid brake system, in general, includes a conventional brake master cylinder 29 that supplies fluid under pressure to all of the wheel cylinders 18 through lines 30 and 32. The master cylinder assembly, in a known manner, translates the foot effort of an operator applied to brake pedal 26 through a linkage 34 into a high pressure fluid force that varies generally as a function of the change in foot effort by the operator.

Brake pedal 26 is pivotally secured at its upper end 36 to a stationary portion of the motor vehicle body, such as, for example, a structural part depending from the conventional dashboard. The pedal is biased in a counterclockwise direction to the dotted line position 37 by a spring (not shown). It is normally maintained in the full line position shown, by means to be described. A short distance (depending upon the leverage desired) below pivot 36, brake pedal 26 is pivotally connected to portions of both the fluid pressure apply linkage 34 and the mechanical apply linkage 28.

Linkage 34 includes a first link 40 pivotally secured at 42 to the actuating rod 44 of master brake cylinder unit 29. The rod would be secured to a master cylinder piston for operation in a known manner. Link 40 is welded or otherwise secured within one end of a sleeve 46 that slidably receives the end of a second link or rod 48 pivotally secured to brake pedal 26 at 38. Depression of the pedal abuts the two links 40 and 48 to move piston rod 44 to the left to force fluid under pressure to wheel cylinders 18 and thereby apply the brakes. Release of the brake pedal to the dotted line position 37 separates links 40 and 48, for a purpose to be described later. The pivotal connection of linkage 34 to piston rod 44 accommodates arcuate movement of link 48 when the brake pedal is released.

The mechanical linkage 28 includes a first rod or link 50 secured to brake pedal 26 at pivot 38. The opposite end of rod 50 is bent at right angles to provide a short pin portion 52 that is slidably received within a slot 54 in a lever 56.

As best seen in FIGURES 1 and 2, lever 56 has a generally yoke-shaped bracket 58, the two ears 60 and 62 having elongated slots or apertures 64 and 66 that are aligned with slot 54, and through which slides a pin or stop means 68. The stop pin limits the sliding movement of pin 52 in slot 54. The stop pin is normally biased through slot 54 by a spring 70 seated against a flange 72 on the pin. A suitable pin guide and bearing sleeve 74 is secured to bracket 58 and fixes the pin against lateral movement while permitting sliding of it in the direction of its longitudinal axis. The pin in this instance would be connected in a suitable manner to a knob 75 on the dash panel of the vehicle within easy reach of the vehicle operator so that it can be retracted or moved out of the cam slot 54 when desired.

Lever or link 56 is pivotally mounted near its midpoint 76 to a stationary portion of the motor vehicle body, and is connected at its lower end to Bowden wire 24, as shown. Lever 56 is biased at all times in a clockwise direction against a right-angled stop 78 by a suitable spring 80.

Mechanical linkage 28 is normally assembled so that the pin end 52 of rod 50 projects into slot 54 of lever 56 in the position shown to the left of stop pin 68, which at this time, is projecting through slot 54. When in this position, brake pedal 26 will be in the full line position, causing links 40 and 48 to abut, as shown. In this position, pin 52 (and rod 50) has a lost motion connection to lever 56.

Depression or movement of brake pedal 26 in a clockwise direction therefore initially moves links 48 and 40 to the left to actuate the master cylinder piston (not shown) and immediately apply fluid under pressure to brake cylinders 18 to apply all four brakes. The simultaneous movement of link 50 to the left is accommodated by the lost motion movement of rod end 52 to the left in slot 54 of lever 56 without causing a counterclockwise rotation of the lever. Thus, initially, the vehicle brakes are applied by the fluid pressure system, the mechanical system at this time being, in effect, inoperative.

If, for some reason, a failure should occur in the fluid pressure system to an extent that the vehicle brakes would not be applied by the master cylinder fluid, continued depression or rotation of brake pedal 26 will move pin 52 to abut the left end of slot 54 and cause a counterclockwise rotation of lever 56. This then will apply the vehicle brakes mechanically through the Bowden wire mechanism 24. Thus, the system provides automatically for a mechanical back-up for applying the vehicle brakes upon continued depression of the brake pedal after a failure in the hydraulic system.

Assssume now that the vehicle operator wishes to apply the emergency brake for vehicle parking purposes. He first pulls out the knob 75 attached to stop pin 68, which retracts pin 68 from cam slot 54 in lever 56 and slot 64 in bracket 58. This positions pin 68 within guide sleeve 74. Since brake pedal 26 is normally biased in a counterclockwise direction, retraction of pin 68 immediately causes rod 50 and its pin end 52 to move to the extreme right end of cam slot 54. In doing so, brake pedal 26 rotates to the dotted line position 37 and moves link 48 to the right to provide a clearance between it and link 40. The operator then releases knob 75, permitting spring 70 to move stop pin 68 to re-enter cam slot 54. This locks the actuating pin end 52 in the position indicated by dotted lines 82 to provide substantially a direct connection between rod 50 and lever 56, thereby eliminating the lost motion connection previously existing between them.

Depression of brake pedal 26 now immediately rotates lever 56 counterclockwise and thereby immediately applies the rear vehicle brakes 22 through Bowden wire 24. Since links 48 and 40 are separated, the brake engaging depresssion of pedal 26 at this time will not cause link 40 or the master cylinder piston rod 44 to move, thus rendering the fluid pressure apply system, in effect, inoperative at this time.

To recondition the system for sequential operation of the brakes by first the fluid pressure system and then the mechanical system, the driver would again pull knob 75 to retract stop pin 68, depress brake pedal 26 to locate the rod pin end 52 ahead of the retraction pin 68, release the knob to cause a reinsertion of retraction pin 68 into cam slot 54, and release the brake pedal to permit the pedal return spring to position the parts as shown in full lines. This simultaneously positions links 40 and 48 in an abutting relationship, and again provides a lost motion connection of the rod 50 to lever 56.

Thus, it will be seen that the operator can actuate the vehicle brakes sequentially by activating the fluid pressure system and subsequently the mechanical back-up system, or can reverse the sequence to apply the emergency or vehicle parking brake first, simply by retracting the stop pin 68 and subsequently depressing brake pedal 26.

While not shown, a suitable locking mechanism would normally be provided cooperating with brake lever 26 when positioned in an emergency or parking brake position between the full and dotted line positions indicated, to permit the engaged brake to remain in that position until released by the vehicle operator in a known manner.

While the mechanical brake apply system has been shown as being connected only to the rear brakes, it will be clear that it could be connected to actuate all of the brakes, or any combination, as desired.

While the invention has been illustrated in its preferred embodiment in the figures, it will be clear to those skilled in the arts to which the invention pertains that many changes and modifications may be made thereto without departing from the scope of the invention.

I claim:

1. A braking system comprising a brake and means for actuating said brake, said actuating means including fluid pressure and mechanical brake apply means each operatively connected to said brake, control means including movable means common to and operatively connected to each of said brake apply means for actuating said apply means independently or in one sequence with respect to each other, and means for reversing the sequence of actuation of said fluid pressure and mechanical brake apply means by said movable means.

2. A braking system comprising a brake and means for actuating said brake, said actuating means including fluid pressure and mechanical brake apply means each operatively connected to said brake, and control means including first means common to and operatively connected to each of said brake apply means for actuating said apply means independently or in sequence with respect to each other, the connection of said first means to said fluid pressure brake apply means including second means for operatively disconnecting said first means at times from said fluid pressure brake apply means.

3. A braking system as in claim 2, said first means comprising an operator movable brake pedal.

4. A braking system as in claim 3, said second means and the operative connection of said pedal to said mechanical means including lost motion connections connecting said pedal to said fluid pressure and mechanical apply means.

5. A braking system as in claim 4, said control means including means rendering inoperative the lost motion connection between said pedal and mechanical apply means.

6. A braking system as in claim 4, said control means including means selctively rendering inoperative the lost motion connections between said pedal and each of said apply means.

7. A braking system as in claim 4, including means operable at will to effect substantially a direct connection of said brake pedal to said mechanical apply means in response to predetermined movement of said brake pedal whereby said mechanical brake apply means will be moved to actuate said brake prior to movement of said fluid pressure apply means.

8. A braking system comprising a brake and means for actuating said brake, said actuating means including fluid pressure and mechanical brake apply means each operatively connected to said brake, and control means including a brake pedal common to and operatively connected to each of said brake apply means for actuating said apply means independently or in sequence with respect to each other, the connection of said brake pedal to said fluid pressure brake apply means including means selectively movable to one position to permit brake actuation by said fluid pressure apply means prior to actuation by said mechanical apply means, and to a second position permitting a reverse sequence of brake actuation by said apply means.

9. A braking system as in claim 8, the operative connection of said pedal to each of said apply means comprising a pair of links having a lost motion engagement with each other.

10. A braking system as in claim 9, said pair of links connected to said fluid apply means comprising a first link pivotally connected to said fluid apply means, and a second link connected to said first link for a sliding movement with respect thereto and pivotally connected to said pedal.

11. A braking system as in claim 9, said paid of links connected to said mechanical apply means comprising a first link pivotally connected to said pedal and having a cam and cam-slot connection to a second link connected to said mechanical apply means.

12. A braking system as in claim 9, said pair of links connected to said fluid apply means comprising a first link pivotally connected to said fluid apply means, a second link connected to said first link for a sliding movement with respect thereto and pivotally connected to said pedal, said pair of links connected to said mechanical apply means comprising a first link pivotally connected to said pedal and having a cam and cam-slot connection to a second link connected to said mechanical apply means.

13. A braking system as in claim 11, including stop means selectively movable at will into the slot into the path of movement of said cam to render inoperative the lost motion connection between said links in response to movement of said pin to one position.

14. A braking system as in claim 13, said stop means being movable into and out of said cam slot and including operator-controlled means selectively movable at will to withdraw said stop means from said slot, means biasing said pedal to an extreme brake released position whereby said cam is engageable with one end of said slot upon retraction of said stop means, reinsertion of said stop means into said slot when said brake pedal is in said extreme position preventing slidable movement of said cam in said slot whereby movement of said pedal towards a brake apply position effects a simultaneous movement of both of said pair of links connected to said mechanical apply means.

15. A braking system comprising a brake, a depressible brake pedal, and connecting means connecting said brake pedal to said brake for actuating said brake, said connecting means including a fluid pressure brake apply system and a mechanical brake apply system each having, respectively, first and second lost motion operative connections to said brake pedal, said first lost motion connection comprising a first pair of end-to-end abuttable links longitudinally slidably mounted with respect to each other and including pivotal connections between one link and said fluid pressure apply means and between the other link and said brake pedal to permit movement of one of said links by the other in one direction of movement of said pedal and the separation of said links upon movement of said pedal in the opposite direction, said second lost motion connection comprising a second pair of links connected at opposite ends, respectively, to said pedal and mechanical apply means and pivotally interconnected by a pin and slot connection, said slot containing a retractible stop means limiting movement of said pin, said pin being positionable on opposite sides of said stop means to permit movement of one of said second pair of links with respect to the other in one position of said pin on one side of said stop means and non-relative sliding movement of said pair of links in another position of said pin on the opposite side of said stop means whereby depression of said pedal with said pin on said one side effects actuation of said brake by said fluid apply means prior to actuation by said mechanical apply means upon abutment of said first pair of links, and depression of said pedal with said pin on said opposite side of said stop means effects actuation of said brake first by said mechanical apply means.

16. A braking system as in claim 15, said stop means including operator-controlled means for retracting said stop means, means biasing said pedal and pin to an extreme brake released position, partial depression of said pedal upon retraction of said stop means abutting said first pair of links and positioning said pin on said one side of said stop means upon reinsertion of said stop means into said slot, retraction of said pin permitting movement of said pedal to said extreme position separating said first pair of links and moving said pin to said opposite side of said stop means.

References Cited

UNITED STATES PATENTS

| 1,561,670 | 11/1925 | Stewart | 188—106 X |
| 2,116,882 | 5/1938 | Dickey | 188—106 X |
| 2,147,955 | 2/1939 | Baits | 188—106 X |
| 2,201,612 | 5/1940 | Fields | 188—106 X |
| 3,175,647 | 3/1965 | Fabbro | 188—106 |

DUANE A. REGER, *Primary Examiner.*